(12) United States Patent
Morris et al.

(10) Patent No.: US 6,541,569 B1
(45) Date of Patent: *Apr. 1, 2003

(54) POLYMER ALLOYS, MORPHOLOGY AND MATERIALS FOR ENVIRONMENTAL REMEDIATION

(75) Inventors: James F. Morris, Tucson, AZ (US); Stephen C. Stelpstra, Tucson, AZ (US)

(73) Assignee: Abtech Industries, Inc.

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/056,349

(22) Filed: Apr. 7, 1998

Related U.S. Application Data

(63) Continuation-in-part of application No. 09/005,332, filed on Jan. 9, 1998.
(60) Provisional application No. 60/634,677, filed on Jan. 10, 1997, provisional application No. 60/048,798, filed on Jun. 6, 1997, and provisional application No. 60/060,565, filed on Sep. 30, 1997.

(51) Int. Cl.[7] .............................................. C08L 53/02
(52) U.S. Cl. ............................ 525/95; 525/97; 525/98; 525/99
(58) Field of Search .................... 502/402; 525/95, 525/97, 99, 89; 210/924; 588/901

(56) References Cited

U.S. PATENT DOCUMENTS

| | | |
|---|---|---|
| 248,559 A | 10/1881 | Jackson |
| 425,641 A | 4/1890 | Van de Walle |
| 543,740 A | 7/1895 | Kuhns |
| 1,032,700 A | 7/1912 | Pickett |
| 1,164,527 A | 12/1915 | Kelly, Jr. |
| 1,274,227 A | 7/1918 | Woodson et al. |
| 1,471,819 A | 10/1923 | Bauschard |
| 1,935,642 A | 11/1933 | Laughlin |
| 2,467,021 A | 4/1949 | Fischer |
| 2,557,079 A | 6/1951 | Cutri |
| 2,813,745 A | 11/1957 | Frieder et al. |
| 2,889,928 A | 6/1959 | Sisk |
| 3,147,216 A | 9/1964 | Oemler et al. |
| 3,221,888 A | 12/1965 | Muller |
| 3,246,582 A | 4/1966 | Wade et al. |
| 3,324,630 A | 6/1967 | Teller et al. .................. 55/90 |
| 3,415,745 A | 12/1968 | Isaacson .................. 210/54 |
| 3,494,862 A | 2/1970 | Horowitz et al. |
| 3,518,183 A | 6/1970 | Evans et al. |
| 3,536,616 A | 10/1970 | Kondoh et al. |
| 3,537,587 A | 11/1970 | Kain |
| 3,538,020 A | 11/1970 | Heskett et al. |
| 3,539,013 A | 11/1970 | Smith |
| 3,565,257 A | 2/1971 | Cavalieri |
| 3,567,660 A | 3/1971 | Winkler |
| 3,594,335 A | 7/1971 | Schultz et al. |
| 3,607,741 A | 9/1971 | Sohnius |
| 3,607,793 A | 9/1971 | Mahlman |
| 3,617,565 A | 11/1971 | Fahlvik |
| 3,617,566 A | 11/1971 | Oshima et al. |
| 3,667,235 A | 6/1972 | Preus et al. |
| 3,667,608 A | 6/1972 | Burroughs et al. |
| 3,679,058 A | 7/1972 | Smith |
| 3,681,237 A | 8/1972 | Orban et al. |
| 3,702,657 A | 11/1972 | Cunningham et al. |
| 3,739,913 A | 6/1973 | Bogosian |
| 3,756,948 A | 9/1973 | Weinberg |
| 3,783,621 A | 1/1974 | Preus et al. |
| 3,800,950 A | 4/1974 | Hess et al. |
| 3,831,760 A | 8/1974 | Economy et al. |

(List continued on next page.)

FOREIGN PATENT DOCUMENTS

| | | |
|---|---|---|
| DE | 136162 | 6/1979 |
| DE | 2904428 | 8/1980 |
| DE | 3122219 A1 | 3/1982 |
| DE | 3634289 | 4/1988 |
| EP | 0 484 061 A1 | 5/1992 |
| EP | 0 518 336 A1 | 12/1992 |
| GB | 13514 | of 1893 |
| GB | 7109 | of 1905 |
| JP | 4-371203 | 12/1992 |

OTHER PUBLICATIONS

Translation oe DE 3122219 (Ochiai et al.) 3–1992.*
Translation of DE 4136647 (Engst) 12–1992.*
PCT Int'l Prelim. Exam. Report, S.N. PCT/US98/00385 (May 20, 1999).
Kristar Enterprises, Fossil Filter, brochure (9/96).

(List continued on next page.)

*Primary Examiner*—Jeffrey Mullis
(74) *Attorney, Agent, or Firm*—Louis J. Hoffman

(57) ABSTRACT

A polymer alloy and method of making same comprising a block copolymer thermoplastic elastomer comprising a microscopic porosity rapidly plasticized by environmental contaminants and a binder of a polymer or copolymer, the binder binding block copolymer particles while preserving the microscopic porosity and providing a macroscopic porosity to allow fluid penetration. The block copolymer preferably comprises styrene-butadiene-styrene (SBS) triblock copolymer, styrene-butadiene (SB) diblock copolymer, or styrene-isoprene-styrene (SIS) triblock copolymer, or a combination thereof, and the binder preferably comprises styrene-ethylene-butadiene (SEB) terpolymer, ethylene-propylene-diene monomer (EPDM) terpolymer, ethylene-propylene (EPR) copolymer, or styrene-butene butadiene (SBB) terpolymer, or a combination thereof. Most preferably the block copolymer comprises styrene-butadiene-styrene (SBS) triblock copolymer and the binder comprises ethylene-propylene-diene monomer (EPDM) terpolymer.

23 Claims, 1 Drawing Sheet

U.S. PATENT DOCUMENTS

| | | |
|---|---|---|
| 3,837,494 A | 9/1974 | Stevenson |
| 3,868,322 A | 2/1975 | Orloff |
| 3,888,766 A | 6/1975 | De Young |
| 3,915,859 A | 10/1975 | Sundin et al. .............. 210/104 |
| 3,916,969 A | 11/1975 | Auerbach et al. |
| 3,923,472 A | 12/1975 | Martinez et al. |
| 3,929,631 A | 12/1975 | Winkler ....................... 210/36 |
| 4,002,177 A | 1/1977 | Rainer et al. |
| 4,031,839 A | 6/1977 | Pedone ....................... 114/270 |
| 4,039,489 A | 8/1977 | Fletcher et al. |
| 4,052,306 A | 10/1977 | Schwartz et al. |
| 4,060,487 A | 11/1977 | Samsel |
| 4,061,807 A | 12/1977 | Shaler et al. |
| 4,065,923 A | 1/1978 | Preus |
| 4,070,287 A | 1/1978 | Wiegand et al. |
| 4,084,380 A | 4/1978 | Hallhagen |
| 4,099,619 A | 7/1978 | Hudler et al. |
| 4,102,783 A | 7/1978 | Zenno et al. ................. 210/36 |
| 4,111,813 A | 9/1978 | Preus |
| RE29,996 E | 5/1979 | Jordan et al. |
| 4,206,080 A | 6/1980 | Sato et al. ................... 252/430 |
| 4,207,378 A | 6/1980 | Klein |
| 4,248,758 A | 2/1981 | Wright |
| 4,261,823 A | 4/1981 | Gallagher et al. |
| 4,264,444 A | 4/1981 | Bronnec |
| 4,332,854 A | 6/1982 | Parker |
| 4,366,067 A | 12/1982 | Golding et al. |
| 4,401,475 A | 8/1983 | Eriksson et al. |
| 4,419,232 A | 12/1983 | Arntyr et al. |
| 4,420,400 A | 12/1983 | Weitzen ....................... 210/710 |
| 4,427,157 A | 1/1984 | Klein |
| 4,429,065 A | 1/1984 | Gancy |
| 4,439,324 A | 3/1984 | Crotti |
| 4,454,039 A | 6/1984 | McCoy |
| 4,497,663 A | 2/1985 | Fisher et al. ................... 134/4 |
| 4,497,712 A | 2/1985 | Cowling |
| 4,519,413 A | 5/1985 | Yoshimura et al. |
| 4,519,431 A | 5/1985 | Yoshimura et al. ..... 152/209 R |
| 4,519,918 A | 5/1985 | Ericsson et al. |
| 4,560,718 A * | 12/1985 | Ritchey ....................... 524/131 |
| 4,592,690 A | 6/1986 | Busch |
| 4,594,157 A | 6/1986 | McGowan .................. 210/163 |
| 4,640,730 A | 2/1987 | Streets et al. |
| 4,672,781 A | 6/1987 | Pichon .......................... 52/94 |
| 4,737,394 A | 4/1988 | Zafiroglu |
| 4,740,435 A | 4/1988 | Markin et al. |
| 4,801,386 A | 1/1989 | Sugimori et al. ........... 210/680 |
| 4,919,820 A | 4/1990 | Lafay et al. |
| 4,929,349 A | 5/1990 | Beckman |
| 4,941,978 A | 7/1990 | Gabrick |
| 4,965,129 A | 10/1990 | Bair et al. |
| 4,980,229 A | 12/1990 | Park et al. |
| 5,009,790 A | 4/1991 | Bustamante et al. |
| 5,032,640 A | 7/1991 | Fachini |
| 5,037,541 A | 8/1991 | Ruey-Jang et al. |
| 5,071,564 A | 12/1991 | Stein et al. |
| 5,075,014 A | 12/1991 | Sullivan |
| 5,104,548 A | 4/1992 | Gabrick |
| 5,133,619 A | 7/1992 | Murfae et al. ................. 404/4 |
| 5,135,578 A | 8/1992 | Billings |
| 5,135,660 A | 8/1992 | Chromecek et al. |
| 5,159,016 A | 10/1992 | Inoue et al. |
| 5,165,821 A | 11/1992 | Fischer et al. |
| 5,173,182 A | 12/1992 | Debellian |
| 5,179,611 A | 1/1993 | Umeda et al. |
| 5,181,802 A | 1/1993 | Thengs et al. |
| 5,186,831 A | 2/1993 | DePetris |
| 5,207,901 A | 5/1993 | Ravagnan |
| 5,211,858 A | 5/1993 | Dovan et al. |
| 5,227,072 A | 7/1993 | Brinkley |
| 5,232,587 A | 8/1993 | Hegemier et al. .......... 210/162 |
| 5,248,729 A | 9/1993 | Inoue et al. |
| 5,252,215 A | 10/1993 | McFarlane et al. |
| 5,256,226 A | 10/1993 | Marzola et al. |
| 5,278,217 A | 1/1994 | Umeda et al. |
| 5,281,463 A | 1/1994 | Cotton |
| 5,297,367 A | 3/1994 | Sainz |
| 5,304,311 A | 4/1994 | Codiglia |
| 5,324,429 A | 6/1994 | Holland |
| 5,330,651 A | 7/1994 | Robertson ................... 210/617 |
| 5,360,548 A | 11/1994 | Stein et al. |
| 5,364,535 A | 11/1994 | Buckalew .................... 210/671 |
| 5,374,600 A | 12/1994 | Hozumi et al. |
| 5,403,474 A | 4/1995 | Emery ......................... 210/163 |
| 5,405,539 A | 4/1995 | Schneider ................... 210/747 |
| 5,407,575 A | 4/1995 | Vinsonhaler |
| 5,414,029 A | 5/1995 | Lemoine et al. |
| 5,423,985 A | 6/1995 | Addeo et al. |
| 5,428,085 A | 6/1995 | Burel et al. |
| 5,432,000 A | 7/1995 | Young, Sr. et al. |
| 5,439,590 A | 8/1995 | Steffan |
| 5,468,539 A * | 11/1995 | Crivelli ....................... 428/141 |
| 5,480,254 A | 1/1996 | Autry et al. |
| 5,496,865 A | 3/1996 | Heese et al. |
| 5,516,845 A | 5/1996 | Heese et al. |
| 5,573,349 A | 11/1996 | Paoluccio ..................... 405/52 |
| 5,624,576 A | 4/1997 | Lenhart et al. |
| 5,632,889 A | 5/1997 | Tharp ......................... 210/165 |
| 5,641,847 A | 6/1997 | Hozumi et al. |
| 5,679,246 A | 10/1997 | Wilcox et al. .............. 210/165 |
| 5,707,527 A | 1/1998 | Knutson et al. ............ 210/660 |
| 5,712,358 A | 1/1998 | Sojka |
| 5,720,574 A | 2/1998 | Barella ......................... 405/52 |
| 5,725,782 A | 3/1998 | Chinn et al. ................ 210/767 |
| 5,744,048 A | 4/1998 | Stetler ......................... 210/803 |
| 5,762,790 A | 6/1998 | Zoeller |
| 5,767,060 A * | 6/1998 | Hanrahan .................... 210/504 |
| 5,788,849 A | 8/1998 | Hutter, Jr. et al. .......... 210/163 |
| 5,820,762 A | 10/1998 | Bamer et al. ................ 210/661 |
| 5,830,967 A | 11/1998 | Sojka |
| 5,834,577 A | 11/1998 | Sojka |
| 5,849,198 A | 12/1998 | Sharpless |
| 5,863,440 A | 1/1999 | Rink et al. .................. 210/693 |
| 5,869,555 A | 2/1999 | Simmons et al. |
| 5,955,552 A | 9/1999 | Sojka |
| 5,958,226 A | 9/1999 | Fleischmann |

OTHER PUBLICATIONS

Fam, Sami, Michael K. Stenstron, and Gary Silverman, "Hydrocarbons in Urban Runoff," *Journal of Environmental Engineering*, vol. 113, No. 5, Oct. 1987, pp. 1032–1046.

Shepp, David L., "Petroleum Hydrocarbon Concentrations Observed in Runoff from Discrete, Urbanized Automotive–Intensive Land Uses," *Watershed '96 Conference Proceedings*, pp. 220–223.

Fam, Sami, Michael K. Stenstron, and Gary Silverman, "Hydrocarbons in Urban Runoff," *Journal of Environmental Engineering*, vol. 113, No. 5, Oct. 1987, pp. 1032–1046.

Shepp, David L., "Petroleum Hydrocarbon Concentrations Observed in Runoff from Discrete, Urbanized Automotive–Intensive Land Uses," *Watershed '96 Conference Proceedings*, pp. 220–223.

Materials re: King County Evaluation of Commercially Available Catch Basin Inserts for Treatment of Stormwater Runoff from Developed Sites, 10/95.

Imtech–Imbibitive Technologies Corporation product literature re"Imbiber Beads," 1993, 1996, 1997.

"HydroCartridges/Rubberizer" product literature, 1994–97.

Aqua Treatment Systems, Inc./"Absorbent W" product literature, 1996–97.

"Innovative Stormwater Treatment Products & Services Guide," prepared for the Stormwater Technologies Trade Shows, Nov. 17 & 19, 1997 (discussing several products, some of which were commercially available before Sep. 1997).

Suntree Isles, Inc. "Curb Inlet Basket" product literature, 1995–96 (and see item A above).

Inventive Resources, Inc. "Water Decontaminator" product literature (4/98 and see item B above).

Alexander, Vera, Bradley is center of world attention this week: *Chickasha Daily Express*, Nov. 4, 1993.

Titan Tech attacks tire recycling mess: *American Metal Market*, Oct. 26, 1993.

Buist, Ian et al., *In–Situ Burning of Alaska North Slope Emulsions*.

Cassidy, Jim, Titan Technologies, Inc.: *Investor's News Wire, Corporate News*, Sep. 9, 1994.

Cassidy, Jim, Titan Potential: *Money World*, April 1995, U.S.

Coxeter, Ruth. A cooler way to melt junked Tires: A McGraw Hill Publication, *Science & Technology*, Nov. 8, 1993, pp. 99.

Dichristina, Mariette, Mired in Tires: *Popular Science*. pp. 62,63,64,83.

Fingas, Mervin et al. The Newfoundland Offshore Burn Experiment Nobe.

Guenette, Chantal, et al., Studies of In–Situ Burning of Emulsions in Norway: *S.L. Ross Environmental Research, Ltd.*

Hydrogrowth. Technology. Petrosorb: *HGPPL– 1 Petroleum Product Spill Encapsulant*, Jun. 18, 1993, p. 1–5.

Environmental Spill Encapsulant Polymers: *JRM Chemical, Inc.*, Form 510, Aug. 1, 1993.

Kansas, Dave, Catalysts and Beams Take Aim at Wastes: *The Wall Street Journal/Marketplace*, Jan. 21, 1994.

Kokish, Bryan, Titan opens pyrolysis plants in S. Korea, *Tire Business*, Dec. 13, 1993.

Metz, Robert, N.M. Firm is ready to roll into the tire recycling industry: *Business—The Boston Globe*, Dec. 28, 1993.

McDonagh, Madeleine et al., *Handling and Disposal of Oily Waste from Oil Spills at Sea*.pp 1–ll.

Brandrup, J. et al., *Polymer Handbook*, 3rd Edition, 1989.

S.L. Ross Environmental Research Limited, Environmental Protection Series: *Selection Criteria and Laboratory Evaluation of Oilspill Sorbents*, Report EPS 3/SP/3, Jun. 1991.

Rushefsky, Carolyn, Old Tires now can be recycled: *Staten Island Advance*, Oct. 22, 1993.

Schulman, Heidi, A New Spin on Old Tires: *Newsweek Focus, Science & Technology*, Nov. 15, 1993.

Team One USA, *Challenger Multi–Mission High Performance GB–Class RIB*.

Titan Technologies, Inc., *Tire Recycling Technologies Corporation*.

Solid Waste Report, *Press Release, Business & Technology*: vol. 24 No. 43, Nov. 4, 1993.

Haz News, Titan develops tyre & plastics recycling: *Press Release*, No. 69, Dec. 1993.

Green Alternatives For Health And The Environment, *Recycling News, Press Release*, vol. IV No. 1, Feb. & Mar. 1994.

Conservation Speculator, *Titan Technologies, Inc., Press Release*, Jun. 1994.

Boardoom Reports, *High–Tech Breakthroughs, Press Release*, Jan. 1, 1994.

Yankee Environmental Services, Inc., *Indirect Transfer— Material Transferred Directly to Collection Chamber*.

Matasorb Industrial Sorbents, *First in Thirst*, source and date unknown.

Pacific Fluid Systems Corp., *Linductor Oil Recovery and Bulk Transfer System*.

Titan Technologies, Inc., *Investor's Booklet*.

* cited by examiner

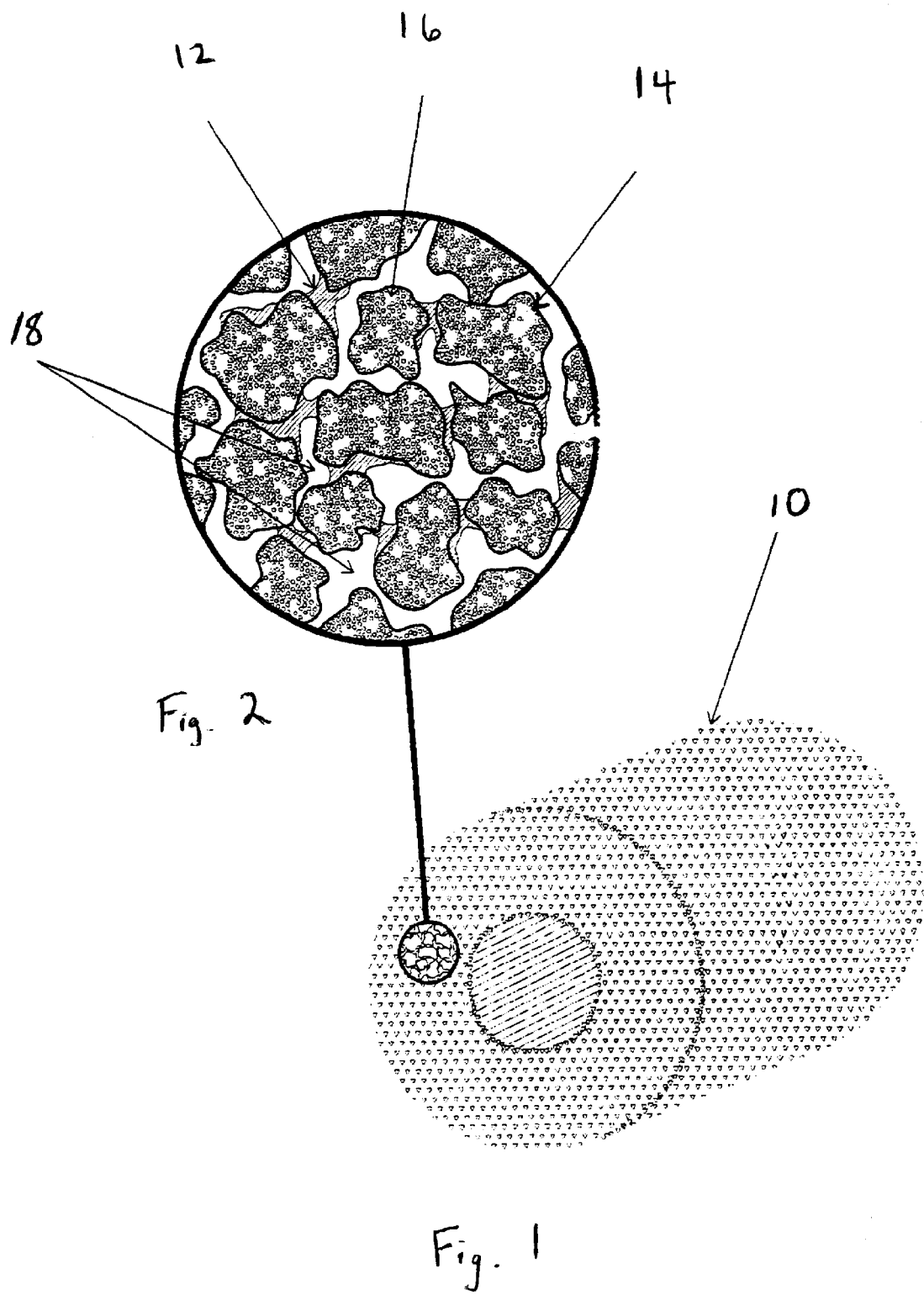

POLYMER ALLOYS, MORPHOLOGY AND MATERIALS FOR ENVIRONMENTAL REMEDIATION

CROSS-REFERENCE TO RELATED APPLICATIONS

This application is a continuation-in-part of U.S. patent application Ser. No. 09/005,332, entitled "Systems for Ameliorating Aqueous Hydrocarbon Spills", to Glenn R. Rink, et al., filed on Jan. 9, 1998, which claims benefit of U.S. Provisional Patent Application Serial No. 60/034,677, filed Jan. 10, 1997, U.S. Provisional Patent Application Serial No. 60/048,798, entitled "Catchbasin Systems for Filtering Hydrocarbon Spills", filed on Jun. 6, 1997, and U.S. Provisional Patent Application Serial No. 60/060,565, entitled "Storm Drain Systems for Filtering Trash and Hydrocarbons", filed on Sep. 30, 1997.

FIELD OF THE INVENTION (TECHNICAL FIELD)

This invention relates generally to unique copolymer alloys useful, for example, in bodies for collecting and retaining hydrocarbon-like contaminant spills on water, as well as non-point source aqueous contaminants, and to methods of making those copolymer alloys and bodies. More particularly, this application relates to unique copolymer compositions found to have remarkably unexpected properties and applications in the collection and retention of hydrocarbon-like contaminants in or on water. The present invention further relates to remediation of environmental contaminants from both point source and non-point sources in and on water.

BACKGROUND OF THE INVENTION

The continuing incidence of oil spillage into both marine and inland waterways, because of shipping accidents and the like, results in enormous annual costs financially to the shipping and insurance industries and is environmentally hazardous and costly. Furthermore, in many industries, environmental contaminants are released with wastewater, or result from spills at the manufacturing facility. These contaminants can be oil-like materials and enter the environment with waste-and-run-off water. Generally, these manufacturing wastes are in much smaller quantities than the petroleum spills mentioned above, but these materials can be much more environmentally hazardous. They may not require the large specialized equipment associated with marine petroleum spills, but containment and remediation is critical.

Many materials are presently known to be oil-absorbent or oil-adsorbent, such as wood chips, other forms of cellulose, activated carbon, wool, cotton balls, corn husks, duck feathers, and certain synthetic polymeric materials. A number of polymeric materials such as polypropylene, the polyesters, polyurethanes, vinyl polymers, and other hydrocarbon-like polymers may be employed, with varying efficiencies.

Sorbents can be divided into three basic categories: natural organic, natural inorganic, and synthetic. Natural organic sorbents include peat moss, straw, hay, sawdust, ground corncobs, feathers, and other readily available carbon-based products. Natural inorganic sorbents include clay, perlite, vermiculite, glass wool, sand, or volcanic ash. Synthetic sorbents include man-made materials that are similar to plastics, such as polyurethane, polyethylene, and nylon fibers. Many existing sorbents tend to soak up water as well as oil, causing them to sink. Many existing sorbents are loose particles such as sawdust, and are difficult to collect after they are spread on the water. Adding flotation devices, such as empty drums attached to sorbent bales of hay, can help alleviate the sinking problem, and wrapping loose particles in mesh can aid in collection.

Previously existing hydrophobic compositions used to absorb or adsorb hydrocarbons have had one or more of the following problems: (1) in powder or small particulate form, they have been difficult to collect after deployment; (2) larger bodies have not floated in water after absorbing contaminants; (3) large bags of compositions such as polypropylene require large amounts of material; and (4) the compositions fail to adquately encapsulate the hydrocarbons, permitting leaching of the hydrocarbons over time.

The present invention is useful in both point source and non-point source contamination remediation, providing desirable characteristics before, during, and after deployment to remediate contamination via unique contaminant-sorbing copolymers which possess an unexpected synergistic propensity to capture and restrain contaminants such as oil spills and like hydrocarbon contaminants. The present invention also provides unique compositions that are both micro- and macro-porous, which further greatly enhances the abilities of devices formed according to the invention.

SUMMARY OF THE INVENTION (DISCLOSURE OF THE INVENTION)

The present invention is of a polymer alloy comprising a block copolymer thermoplastic elastomer comprising a microscopic porosity rapidly plasticized by environmental contaminants and a binder of a polymer or copolymer, the binder binding block copolymer particles while preserving the microscopic porosity and providing a macroscopic porosity to allow fluid penetration. In the preferred embodiment, an interfacial alloy exists between the block copolymer and the binder. The block copolymer preferably comprises styrene-butadiene-styrene (SBS) triblock copolymer, styrene-butadiene (SB) diblock copolymer, or styrene-isoprene-styrene,(SIS) triblock copolymer, or a combination thereof, and the binder preferably comprises styrene-ethylene-butylene copolymer, ethylene-propylene-diene monomer (EPDM) terpolymer, ethylene-propylene (EPR) copolymer, or styrene-butene/butylene (SBB) copolymer or a combination thereof. Most preferably the block copolymer comprises styrene-butadiene-styrene (SBS) triblock copolymer and the binder comprises ethylene-propylene-diene monomer (EPDM) terpolymer, and the alloy may consist or, or consist essentially of, these two substances.

The invention is also of a polymer alloy comprising a block copolymer, namely styrene-butadiene-styrene (SBS), styrene-butadiene (SB) diblock copolymer, or styrene-isoprene-styrene (SIS) triblock copolymer, and a binder of a polymer or copolymer. In the preferred embodiment, the binder comprises styrene-ethylene-butadiene (SEB) terpolymer, ethylene-propylene-diene monomer (EPDM) terpolymer, ethylene-propylene (EPR) copolymer, or styrene-butene butadiene (SBB) terpolymer. Most preferably the block copolymer comprises styrene-butadiene-styrene (SBS) triblock copolymer and the binder comprises ethylene-propylene-diene monomer (EPDM) terpolymer, and the alloy may consist or, or consist essentially of, these two substances.

The invention is further of a polymer alloy comprising a block copolymer thermoplastic elastomer and a binder, namely styrene-ethylene/butylene (SEB) copolymer, ethylene-propylene-diene monomer (EPDM) terpolymer, ethylene-propylene (EPR) copolymer, or styrene-butene/butylene (SBB) copolymer. In the preferred embodiment, the block copolymer thermoplastic elastomer comprises a member selected from the group consisting of styrene-butadiene-styrene (SBS), styrene-butadiene (SB) diblock copolymer, and styrene-isoprene-styrene (SIS) triblock copolymer. Most preferably the block copolymer comprises styrene-butadiene-styrene (SBS) triblock copolymer and the binder comprises ethylene-propylene-diene monomer (EPDM) terpolymer, and the alloy may consist or, or consist essentially of, these two substances.

The invention is additionally of a method of producing a polymer alloy comprising: a) providing particles of a block copolymer thermoplastic elastomer comprising a microscopic porosity rapidly plasticized by environmental contaminants; and b) binding the particles with a binder selected from the group consisting of polymers and copolymers while preserving the microscopic porosity and providing a macroscopic porosity to allow fluid penetration. In the preferred embodiment, binding comprises establishing diffusion of the binder into the block copolymer. A further step of thermal annealing at a temperature approximately 5° C. lower than a softening point of the block copolymer is preferably employed, preferably for approximately 45 minutes at approximately 27–93° C. An additional step of sizing the block copolymer particles by grinding without adding a parting agent is preferably employed, preferably to approximately 6–24 mesh. The alloy may be formed by extrusion, compression molding, or injection molding. The block copolymer preferably comprises styrene-butadiene-styrene (SBS) triblock copolymer, styrene-butadiene (SB) diblock copolymer, and styrene-isoprene-styrene (SIS) triblock copolymer, and the binder preferably comprises styrene-ethylene/butylene (SEB) copolymer, ethylene-propylene-diene monomer (EPDM) terpolymer, ethylene-propylene (EPR) copolymer, and styrene-butene/butylene (SBB) terpolymer. Most preferably the block copolymer comprises styrene-butadiene-styrene (SBS) triblock copolymer and the binder comprises ethylene-propylene-diene monomer (EPDM) terpolymer, and formation is by extrusion of the bound particles.

The invention is also of a method of producing a polymer alloy comprising: a) providing particles of a block copolymer thermoplastic elastomer, namely styrene-butadiene-styrene (SBS) triblock copolymer, styrene-butadiene (SB) diblock copolymer, or styrene-isoprene-styrene (SIS) triblock copolymer; and b) binding the particles with a binder selected from the group consisting of polymers and copolymers. In the preferred embodiment, the binder comprises styrene-ethylene-butylene (SEB) copolymer, ethylene-propylene-diene monomer (EPDM) terpolymer, ethylene-propylene (EPR) copolymer, or styrene-butene/butylene (SBB) copolymer. Most preferably the block copolymer comprises styrene-butadiene-styrene (SBS) triblock copolymer and the binder comprises ethylene-propylene-diene monomer (EPDM) terpolymer, and formation is by extrusion of the bound particles.

The invention is further of a method of producing a polymer alloy comprising: a) providing particles of a block copolymer thermoplastic elastomer; and b) binding the particles with a binder selected from the group consisting of styrene-ethylene-butadiene (SEB) terpolymer, ethylene-propylene-diene monomer (EPDM) terpolymer, ethylene-propylene (EPR) copolymer, and styrene-butene butadiene (SBB) terpolymer. In the preferred embodiment, the block copolymer comprises styrene-butadiene-styrene (SBS) triblock copolymer, styrene-butadiene (SB) diblock copolymer, or styrene-isoprene-styrene (SIS) triblock copolymer. Most preferably the block copolymer comprises styrene-butadiene-styrene (SBS) triblock copolymer and the binder comprises ethylene-propylene-diene monomer (EPDM) terpolymer, and formation is by extrusion of the bound particles.

The invention is additionally of a material for recovering hydrocarbon contaminants from water comprising a polymer alloy comprising: a) particles having micro-porous spaces for infiltration and capture of hydrocarbons; b) a binder composition connecting the particles to neighbor particles; and c) macro-porous spaces adjacent to substantially all of the particles permitting infiltration of hydrocarbons substantially throughout the material. In the preferred embodiment, the particles comprise styrene-butadiene-styrene (SBS) triblock copolymer, styrene-butadiene (SB) diblock copolymer, and styrene-isoprene-styrene (SIS) triblock copolymer, and the binder comprises styrene-ethylene/butylene (SEB) copolymer, ethylene-propylene-diene monomer (EPDM) terpolymer, ethylene-propylene (EPR) copolymer, and styrene-butene butadiene (SBB) terpolymer. Most preferably the block copolymer comprises styrene-butadiene-styrene (SBS) triblock copolymer and the binder comprises ethylene-propylene-diene monomer (EPDM) terpolymer, and the alloy may consist or, or consist essentially of, these two substances. The material is preferably formed into a tubular body or bodies and deployed onto a contaminant spill to remediate the spill. The bodies may be formed into collectivities within bags, blankets, bales, booms, pillows, and filters.

A primary object of the present invention is to provide a contaminant sorbing composition and system that is hydrophobic, highly contaminant absorbent, and readily collectible, floats after absorbing contaminants, and does not leach contaminants.

A primary advantage of the present invention is that the combined micro- and macro-porous nature of the copolymer alloy of the invention permits the primary object of the invention to be realized.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a perspective cross-section view of a tubular body made from the composition of the invention; and FIG. 2 is a microscopic rendering of the composition of the invention.

DESCRIPTION OF THE PREFERRED EMBODIMENTS (BEST MODES FOR CARRYING OUT THE INVENTION)

The present invention uses an alloy of at least two granular polymers or copolymers, at least one of which is a block copolymer. These materials are formed into a body with a macro-porous morphology such that the granular block copolymer maintains its original micro-porous structure. The alloying of the two (or more) components forms a cohesive structure with both macroscopic and microscopic porosity, which allows penetration of the environmental contaminant into the bulk product with subsequent rapid absorption. This alloying provides product stability before and after the absorption occurs. Oil, for example, is readily encapsulated and bonded within the polymer structure. The resulting solidified oil/polymer mixture remains buoyant after recovery and is substantially impervious to aqueous absorption (i.e., hydrophobic).

For purposes of the specification and claims, "contaminant" means a composition that is undesirable in a particular environment in which it is located, including the following compositions susceptible to sorbing from within or on a body of fluid (most particularly water) or fluid stream (most particularly aqueous): hydrocarbons, heavy metals, solvents, and like compositions of danger to humans, wildlife, plants, and/or their habitats.

The invention utilizes polymers or copolymers that exhibit interfacial alloying and strongly absorb hydrocarbon-like liquids without destroying the interfacial alloy or compromising the integrity of the product. A second aspect of the invention is the process by which the interfacial alloy is produced without significantly altering the microporous nature of the component particles. The process produces the macroscopic porosity that provides a path for the liquid to the microporosity of the component particles. This combination of initial microporosity and large pores created in the process gives rise to rapid and substantial liquid absorption. The interfacial alloying provides the stability needed for deployment and recovery.

The invention allows for the deployment and recovery of the copolymer from a liquid medium without the loss of the polymer or absorbed contaminant back into the environment. It also allows for the extended deployment of the polymer, such as in a tubular body 10 as shown in FIG. 1, so that it is available to absorb and contain contaminant without leaching and provide material structure and processes by which granular polymer absorbents are configured into a retrievable structure while maintaining the microscopic porosity of the individual particles.

Referring to FIG. 2, the invention includes a polymer alloy at the interfaces between granular components. This alloy comprises two or more components, at least one of which is a multitude of particles 14 of a block copolymer thermoplastic elastomer formed with a multitude of microscopic pores 16 that becomes rapidly plasticized by a liquid contaminant. An additional component(s) selected from polymers or copolymers 12 is used to bind the block copolymer particles 14 into a structure that preserves the microscopic morphology of the block copolymer while forming macroscopic capillaries or pores 18, helpful in allowing contaminant penetration throughout the entire structure.

The microscopic porosity of the block copolymer is developed during its manufacture as exists in the raw material for the product. These block copolymers are preferably formed via a polymerization process that leaves the bulk material with contained water. Flash evaporation of this contained water results in the desired microporosity. The process of the invention for alloying and forming the product preserves this porosity.

To realize an effective, cohesive structure, an interfacial alloy is preferably formed between material of the binder 12 and absorbing block copolymer particles 14. Because this alloy is randomly created during the processing of the components, the particle size of the polymers is crucial in establishing the proper macroscopic morphologies of the structure. The block copolymer particles are preferably sized by grinding, preferably without adding a parting agent, to approximately 6–24 mesh. The structure formed is designed to maximize the absorption capabilities while developing a stable spatial matrix to provide ingress of contaminant to individual polymer particles.

The interfacial alloy is formed during fabrication of the alloy of the invention by sufficient softening of the binder material to permit diffusion of the binder material into the bulk of the block copolymer particles. Upon cooling, the binder material hardens in place within the micropores, forming a physical bond between the binder material and the block copolymer. The unique composition and structure of the invention is achieved by mixing pre-sized particles of the absorbent block copolymer particles with binder material that is capable of forming an interfacial alloy with the absorbent to form a stable bulk body. The binder polymer or copolymer serves to cement the absorbing particles together by the formation of the interfacial alloy and to form stable macroscopic porosity during processing and providing mechanical integrity after absorbing a target contaminant. While the binder may also be a block copolymer with similar properties to the absorbent, this is not a requirement.

The process of the invention preferably comprises two stages. First, there is compression of the mixed particles at a temperature sufficient to permit inter-diffusion of the binder materials molecules into the absorbent, but not sufficiently high that the particles of the block copolymer join together directly. Second, there is an annealing step carried out at a temperature below the softening point of the absorbent, which allows body expansion and the development of macroscopic porosity connected to the original microscopic porosity. These two steps form a bulk structure with two types of pore morphology that are preserved and connected. Because of the interfacial alloy formation, this structure functions and remains mechanically stable.

The compression and alloying step is preferably carried out at a temperature that permits diffusion of the binder into the external surfaces of the absorbent particles. This temperature generally is near the softening point of the absorbent to alloy quickly in the compression step. Thus, this temperature is governed by the absorbent composition. Annealing is preferably carried out at a lower temperature to provide a memory within the absorbent particles of the initial pore structure and cause rebound to near precompression dimensions. For example, with certain compositions below exemplifying the product, the polystyrene within the absorbent is the primary provider of body integrity and dimensional memory which softens near 212° F. (100° C.) and governs the preferred process temperatures.

The preferred materials for the particles are styrene-butadiene-styrene (SBS) triblock copolymer, styrene-butadiene (SB) diblock copolymer, and styrene-isoprene-styrene (SIS) triblock copolymer. The preferred binder materials are styrene-ethylene/butylene (SEB) copolymer, ethylene-propylene-diene monomer (EPDM) terpolymer, ethylene-propylene (EPR) copolymer, and styrene-butene/butylene (SBB) copolymer. The most preferred combination is SBS and EPDM.

The creation of the unique polymer alloy of the invention is accomplished without vulcanization and can be carried out by any of three preferred processing methods. Most preferably, it can be created by extrusion, but it can also be formed by compression or injection molding.

As an example, the alloy of the invention can be created by extruding a mixture comprising 70% styrene-butadiene-styrene (SBS) block copolymer and 30% ethylene-propylene-diene terpolymer (EPDM). These components are mixed and extruded at processing temperatures preferably not to exceed 130° F. (54° C.) followed by thermal annealing at preferably approximately 120° F. (49° C.). This formulation has an oil retention capacity of approximately 2 gallons or more per pound.

Employing lab test method ASTM F716-82(1993)e1, Sections 11.1 and 11.2, the absorbency ratios of Table I were obtained.

TABLE I

|  | American Petroleum Institute (API) Viscosity Index | 10-Minute Absorbency Ratio By Weight (oil:sorbent) | 2-Hour Absorbency Ratio By Weight (oil:sorbent) | 24-Hour Absorbency Ratio By Weight (oil:sorbent) |
| --- | --- | --- | --- | --- |
| Diesel | 35.0 | 5.5:1 | 9.6:1 | 14.5:1 |
| Kuwait Light Crude | 37.8 | 8.6:1 | 9.1:1 | 9.9:1 |
| North Slope Crude | 26.8 | 3.4:1 | 5.8:1 | 8.9:1 |
| Gear Oil | 23.7 | 2.0:1 | 2.2:1 | 3.3:1 |

Also as an example, the alloy can be created by extruding a mixture comprising 70% SBS block copolymer and 30% ethylene-propylene (EPR) copolymer. These components are mixed and extruded at processing temperatures preferably not to exceed 130° F. (54° C.) followed by thermal annealing at 120° F. (49° C.).

Alternatively, the same composition can be compression molded, placed in a mold cavity and subjected to a pressure preferably not to exceed 100 PSI (0.689 megaPascals) with heating to 130° F. (54° C.) for 15 minutes. Following the compression molding, these bodies are annealed at 120° F. (49° C.) for 45 minutes.

As another example, the alloy can be created by extruding a mixture comprising 80% SBS block copolymer and 20% styrene-ethylene/butylene (SEB) copolymer. These components are mixed and extruded at processing temperatures preferably not to exceed 210° F. (99° C.) followed by thermal annealing at 190° F. (88° C.).

As a further example, the alloy can be created by extruding a mixture comprising 80% SBS block copolymer and 20% styrene-isoprene-styrene (SIS) triblock copolymer. These components are mixed and extruded at processing temperatures preferably not to exceed 210° F. (99° C.) followed by thermal annealing at 190° F. (88° C.).

Alternatively, the same composition can be compression molded, placed in a mold cavity, and subjected to a pressure preferably not to exceed 100 PSI (0.689 megaPascals) with heating to 210° F. (99° C.) for 15 minutes. Following the compression molding, these bodies are annealed at 190° F. (88° C.) for 45 minutes.

The terminal step in all processing methods is a thermal annealing protocol. It is this annealing time of about 45 minutes at 80–200° F. (27–93° C.) that provides for a rebound expansion of the body. For polystyrene stabilized bodies, this temperature is most effectively 9–10° F. (5° C.) below the alloying temperature for optimum expansion to occur at the shortest annealing times. This expansion is necessary to establish both the proper number of alloying bonds per body, as well as allow for the proper development of the macro-porosity, which maximizes the fluid ingress into the body and its micropores.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Furthermore, the compositions of the invention can be used within the various structures described in the related applications first above listed.

What is claimed is:

1. An absorbent polymeric material comprising particles of block copolymer, and a copolymer alloyed with said block copolymer by compressing said block copolymer and said copolymer at a temperature to permit diffusion of said copolymer into said block copolymer, followed by annealing said polymeric material at a temperature below the softening point of said block coploymer.

2. The absorbent polymeric material of claim 1 wherein said block copolymer is selected from the group consisting of styrene-butadiene-styrene (SBS), styrene-butadiene (SB), and styrene-isoprene-styrene (SIS).

3. The absorbent polymeric material of claim 2 wherein said copolymer is an ethylene-propylene (EPR) copolymer.

4. The material of claim 1 wherein the particles of block copolymer have microporous spaces sized to allow infiltration and capture of contaminants and the annealed polymeric alloy has macroscopic channels permitting infiltration of contaminants substantially throughout said material.

5. An absorbent polymeric material comprising particles of styrene-butadiene-styrene (SBS) block copolymer, and ethylene-propylene-diene-monomer (EPDM) copolymer alloyed with said (SBS) block copolymer by compressing said (SBS) block copolymer and said (EPDM) copolymer at a temperature and pressure to permit diffusion of said (EPDM) copolymer into said (SBS) block copolymer, followed by annealing said polymeric material at a temperature below the softening point of said (SBS) block coploymer.

6. The absorbent polymeric material of claim 5 comprising approximately about 70% by weight styrene-butadiene-styrene (SBS) block copolymer and approximately about 30% by weight ethylene-propylene-diene-monomer (EPDM) copolymer.

7. The absorbent polymeric material of claim 5 wherein said particles of styrene-butadiene-styrene (SBS) are of size 6 to 24 mesh.

8. An absorbent polymeric material comprising particles of block copolymer consisting essentially of styrene-butadiene-styrene (SBS) having microporous spaces sized to allow infiltration and capture of contaminants and a copolymer consisting essentially of ethylene-propylene-diene-monomer (EPDM) binding said particles of block copolymer, said polymeric material having macroscopic channels permitting infiltration of contaminants substantially throughout said material.

9. The material of claim 8 wherein said block copolymer consists of SBS and said copolymer consists of EPDM.

10. The material of claim 8 wherein the EPDM copolymer physically binds the particles of SBS block copolymer.

11. The material of claim 9 wherein the EPDM copolymer physically binds the particles of SBS block copolymer.

12. An absorbent polymeric material comprising particles of styrene-butadiene-styrene (SBS) block copolymer having microporous spaces sized to allow infiltration and capture of contaminants and ethylene-propylene-diene-monomer (EPDM) copolymer binding said particles of SBS block copolymer, said polymeric material having macroscopic channels permitting infiltration of contaminants substantially throughout said material.

13. The material of claim 12 wherein the microporous spaces are sized to allow infiltration and capture of contaminants selected from the group consisting of hydrocarbons and halogenated hydrocarbons.

14. The material of claim 12 wherein said SBS particles are in the range of about 6 to 24 mesh.

15. The material of claim 12 wherein the EPDM copolymer physically binds the particles of SBS block copolymer.

16. The material of claim 15 wherein the microporous spaces are sized to allow infiltration and capture of contaminants selected from the group consisting of hydrocarbons and halogenated hydrocarbons.

17. The material of claim 16 wherein said SBS particles are in the range of about 6 to 24 mesh.

18. An absorbent polymeric material comprising particles of block copolymer having microporous spaces sized to allow infiltration and capture of contaminants and an ethylene-propylene (EPR) copolymer physically binding said particles of block copolymer, said polymeric material had macroscopic channels permitting infiltration of contaminants substantially throughout said material.

19. The material of claim 18 wherein said block copolymer is selected from the group consisting of styrene-butadiene-styrene (SBS), styrene-butadiene (SB), and styrene-isoprene-styrene (SIS).

20. The absorbent polymeric material of claim 1 wherein compressing said block copolymer and said copolymer comprises extruding said block copolymer and said copolymer.

21. The absorbent polymeric material of claim 20 wherein extruding said block copolymer and said copolymer comprises extruding at a processing temperature not to exceed 54° C., and wherein annealing said polymeric material comprises annealing at a temperature of about approximately 49° C.

22. The absorbent polymeric material of claim 5 wherein compressing said SBS and EPDM comprises extruding said SBS and EPDM.

23. The absorbent polymeric material of claim 22 wherein extruding said SBS and EPDM comprises extruding at a processing temperature not to exceed 54° C., and wherein annealing said polymeric material comprises annealing at a temperature of about approximately 49° C.

* * * * *